United States Patent [19]

Bauer et al.

[11] Patent Number: 4,865,739
[45] Date of Patent: Sep. 12, 1989

[54] PROCESS FOR PRODUCING A POROUS MINERAL MEMBRANE ON A MINERAL SUPPORT

[75] Inventors: Jean-Michel Bauer, Pagny sur Moselle; Maurice Bontems, Montigny Les Metz; Denis Desmicht, Pagny sur Moselle; Jacques Maire, Paris; Serge Mollet, Pagny sur Moselle; Maurice Verna, Nice, all of France

[73] Assignee: Le Carbone Lorraine, Courbevoie, France

[21] Appl. No.: 63,444

[22] Filed: Jun. 18, 1987

[30] Foreign Application Priority Data

Jun. 19, 1986 [FR] France ................ 86 09553

[51] Int. Cl.[4] ............ B01D 13/00; B01D 29/24; C04B 38/00; B29D 39/12
[52] U.S. Cl. ............ 210/490; 210/500.21; 264/29.5; 264/109; 264/113; 264/122
[58] Field of Search ............ 264/29.5, 109, 113, 264/123, 122; 210/500.21, 490

[56] References Cited

U.S. PATENT DOCUMENTS

| | | | |
|---|---|---|---|
| 3,859,421 | 1/1975 | Hucke | 264/44 X |
| 4,041,116 | 8/1977 | Baud et al. | 264/29.5 |
| 4,060,488 | 11/1977 | Hoover et al. | 210/433 M |
| 4,321,298 | 3/1982 | Shaffer et al. | 264/29.5 X |
| 4,439,382 | 3/1984 | Joó et al. | 264/29.5 |
| 4,500,328 | 2/1985 | Brassell et al. | 55/97 |
| 4,508,762 | 4/1985 | Rousseau | 264/29.5 X |
| 4,597,923 | 7/1986 | Kennedy et al. | 264/29.5 X |
| 4,722,817 | 2/1988 | Nakano et al. | 264/29.5 |

FOREIGN PATENT DOCUMENTS

| | | |
|---|---|---|
| 956760 | 10/1974 | Canada . |
| 975629 | 10/1975 | Canada . |
| 0092840 | 11/1982 | European Pat. Off. . |
| 2110123 | 5/1972 | France . |
| 2182842 | 12/1973 | France . |
| 604826 | 12/1977 | Switzerland . |

OTHER PUBLICATIONS

Fitzer, E. and W. Schäfer, "The Effect of Crosslinking on the Formation of Glasslike Carbons from Thermosetting Resins".
In *Carbon*, vol. 8, pp. 353–364, (1970), Pergamon Press.
*The Condensed Chemical Dictionary*, Tenth Edition, Revised by Gessner G. Hawley, New York, Van Nostrand Reinhold, ©1981, p. 1016.

Primary Examiner—Philip Anderson
Attorney, Agent, or Firm—Dennison, Meserole, Pollack & Scheiner

[57] ABSTRACT

The invention relates to a process for preparing mineral and in particular, carbon-containing membranes on a porous mineral support. According to the process, at least one layer of a stable emulsion of mineral particles in a solution containing a thermosetting resin is deposited on a permeable, porous, mineral support. The resin undergoes a polycondensation treatment followed by coking, and the coke formed insures the mechanical connection of the mineral particles both to one another and to the support. The membranes produced according to the invention can be used in separating processes, particularly in microfiltration and ultrafiltration.

16 Claims, 2 Drawing Sheets

PROCESS FOR PRODUCING A POROUS MINERAL MEMBRANE ON A MINERAL SUPPORT

TECHNICAL FIELD OF THE INVENTION

The present invention relates to a process for producing permeable, porous, mineral membranes on porous, permeable supports. These membranes are intended for use in separating processes and more particularly microfiltration and ultrafiltration. The term mineral membranes is understood to mean carbon-containing or ceramic material membranes.

PRIOR ART

Among separating processes, microfiltration and ultrafiltration or reverse osmosis most frequently have recourse to organic membranes, which have to be mechanically maintained on a support. In addition, these membranes remain relatively sensitive to corrosion and temperature changes.

In order to solve this problem, homogeneous carbon or asymmeteric ceramic supports have appeared on the market. In order that said supports can be used in ultrafiltration or microfiltration, it is necessary to deposit a membrane based on ceramic powder (zirconia, alumina, titanium, clay, etc). The necessary procedures are known. They consist of either using a sol-gel, or the engobe coating of a defloculated emulsion. The behaviour of the thus deposited membrane is obtained by thermal sintering of the ceramic grains.

Despite the good thermal behaviour of these ceramics, they do not always satisfy the criteria necessary for corrosion resistance and/or alimentary compatibility.

It is also known that carbon has an excellent chemical and thermal resistance and a recognized alimentary compatibility. However, although it is possible to deposit carbon-containing product emulsions on a porous support, said product cannot be sintered.

SUMMARY OF THE INVENTION

One of the objects of the invention is to surmount this disadvantage in order to obtain a mechanically strong carbon-containing membrane and whose texture can also be adjusted.

Another object of the invention is to obtain a membrane made from a mechanically strong ceramic material and whose texture can also be adjusted by a process which does not involve sintering.

These objects are achieved according to the invention by a process for producing a permeable, porous, mineral membrane, characterized in that on a permeable, porous, mineral support is deposited at least one layer of a stable emulsion of mineral particles in a solution containing a cokable thermosetting resin and that the resin undergoes a polycondensation treatment, followed by coking, the coke formed ensuring both the mechanical connection of the mineral particles to one another and to the support.

The mineral particles can be of carbon, the word carbon being understood in the widest sense and designating coke, carbon black, graphite, etc or of a ceramic material, such as silicon carbide, silicon nitride, titanium oxide, zirconium, etc.

The mineral particles can be in the form of small fibres or grains, such as trichites. Their dimensions are chosen as a function of the sought texture for the membrane.

For example, the thermosetting resin can be a phenolic resin or any resin which, after coking, leaves an adequate coke level to ensure the necessary behaviour of the deposit.

The emulsions used can be of the "engobe" type, i.e. defloculated emulsions in an appropriate agent.

For example, the particles are vigorously mixed in a polyvinyl alcohol to which has been added a defloculating agent, such as an ammonium salt. To this mixture is added the thermosetting resin used for the agglomeration of the particles. Following the deposition of this engobe on the support, floculation takes place which, after drying, ensures that the thus deposited layer is continuous and has a regular thickness. This complete procedure is called "engobe coating".

It is also possible to use for the emulsion a "master paste" of paint based on mineral particles, emulsion taking place in a solute containing the thermosetting resin. In this case, the deposit on the support takes place by coating.

In all cases, the resin undergoes a polycondensation treatment, followed by a coking treatment at between 400° and 3000° C.

The permeable, porous support can be of various materials able to withstand the resin coking temperatures, i.e. carbon in the widest sense, ceramics, etc. The support can advantageously be of carbon, as are the particles. For example, it is possible to choose for the support a polygranular carbon or a carbon fibre/carbon matrix composite. In this case, an all carbon filtering element is obtained, i.e. having all the properties inherent in carbon and consequently usable in numerous fields.

The production process according to the invention makes it possible to obtain, as desired, a membrane adhering to its support and having a texture adjusted to its intended use. Thus, as a function of the texture of the support, it is possible to successively deposit emulsion layers of mineral particles of different grain sizes in each layer, starting with the largest particles. In this case, there is no need for coking between each layer deposit, it merely being necessary to carry out a careful polycondensation, coking taking place when all the layers have been deposited. Thus, a very permeable, selective, asymmetric composite membrane is obtained.

It should be noted that in order to adjust the texture, it is possible to impregnate the support with an appropriate impregnating agent, but such a process leads to a homogeneous material, which although selective, is not very permeable. Thus, the superiority of the process according to the invention is readily apparent.

In the case where the support has a relatively loose or weak texture, the number of layers deposited to obtain the membrane with the desired texture can be considerably reduced if the first layer is produced with an emulsion of a fibrous material. This fibrous material is advantageously constituted by trichites of carbon or ceramic material, such as silicon carbide, silicon nitride, etc. Thus, to a loose texture support, it is necessary to apply a succession of layers of mineral particles of decreasing grain size, whereof the first is relatively large in order to prevent "punching" or penetration of the support. A deposit with an emulsion containing a fibrous material behaves like a non-woven fabric not reducing the permeability of the support and serving as a support for the following layers containing the finer particles.

The actual production process of the invention makes it possible to obtain a membrane on variable geometry supports, i.e. plates, tubes, shaped members, etc. It is particularly appropriate for the deposition of membranes on the inside of tubular supports.

It should be noted that, if for reasons of texture or cost, it is wished to deposit on the said support layers of different natures (e.g. one layer containing silicon carbide trichites, followed by one or more layers containing carbon powder), this is made possible by the process according to the invention.

APPLICATION EXAMPLES

The following examples given in an indicative and non-limitative manner serve to illustrate the invention.

EXAMPLE 1

The support is a carbon fibre/carbon matrix composite with an air permeability 200,000 $cm^3 \cdot s^{-1} \cdot m^2 \cdot bar^{-1}$ and with an average pore diameter of 30 $\mu$m.

Engobe coating takes place on said support, i.e. the deposition of the engobe as defined hereinbefore, said engobe being constituted by an emulsion of 4 $\mu$m coke particles, whilst the thermosetting resin is a phenolic resin. Following polycondensation and coking of the resin, a membrane is obtained having an air permeability of 120,000 $cm^3 \cdot s^{-1} \cdot m^2 \cdot bar^{-1}$ and with an average pore diameter of 20 $\mu$m.

EXAMPLE 2

Figure 1:
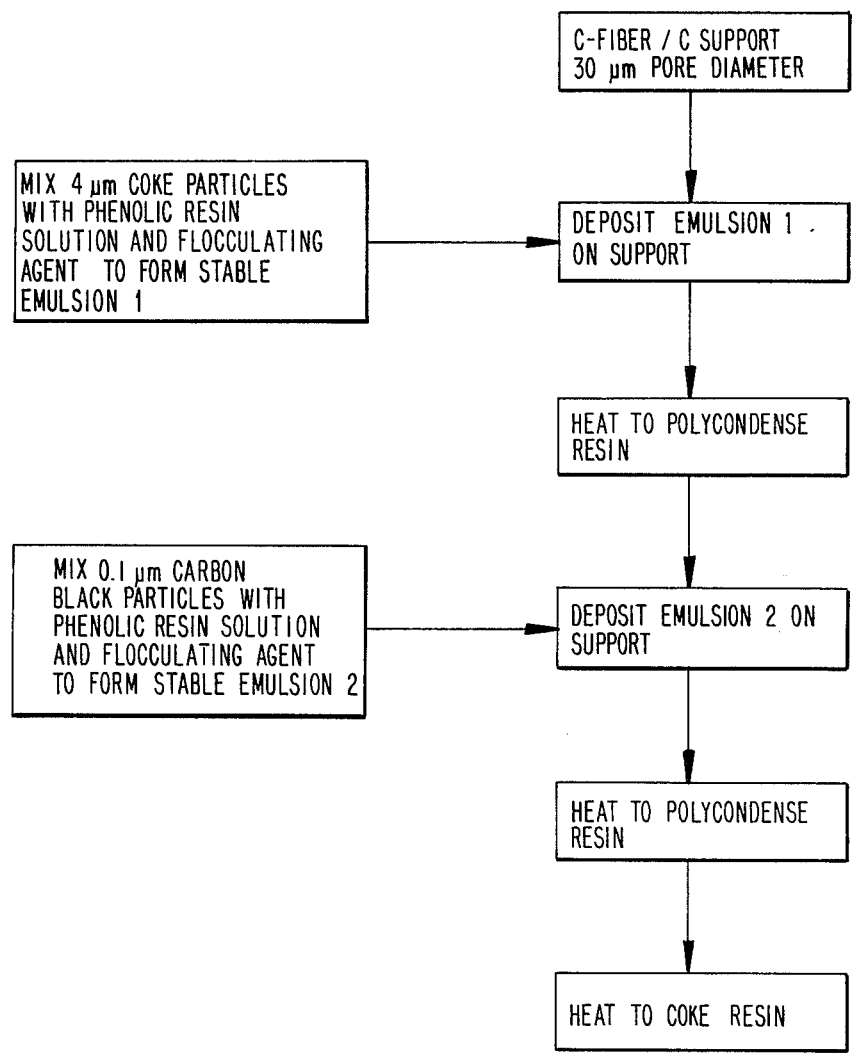
FIG. 1 is a flow diagram of the process steps of the invention.

The process steps used to produce the membrane in this example are set forth in the flow diagram in FIG. 1.

The support is the same as in example 1. Two successive engobe coatings are formed on this support using emulsion containing carbon particles of different grain sizes, the first containing 4 $\mu$m coke particles and the second 0.1 $\mu$m carbon black particles, the thermosetting resin being a phenolic resin. Each engobe coating is followed by polycondensation of the resin. Following the final coking, a membrane is obtained having an air permeability of 50,000 $cm^3 \cdot s^{-1} \cdot m^{-2} \cdot bar^{-1}$ and with an average pore diameter of 1 to 5 $\mu$m.

Figure 2:
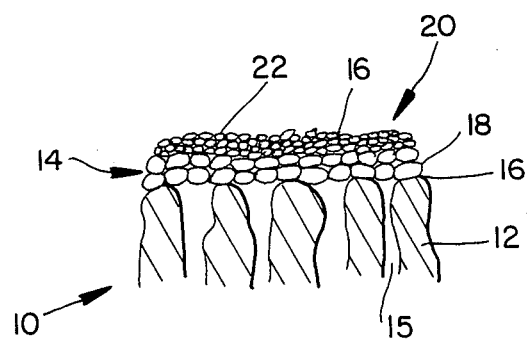
FIG. 2 is a cross-sectional view of a membrane and porous support produced according to the process of the invention.

The supported membrane produced in this example is shown in cross-section as 10 in FIG. 2. As seen in FIG. 2, a support 12 is covered on its surface with a first layer 14 of 4 $\mu$m coke particles 16, which do not penetrate into support pores 15. The coke particles 16 are bonded to each other into support 12 by means of a coke layer 18 formed by coking of the resin.

On top of layer 14 is an additional layer 20 formed of 0.1 $\mu$m carbon black particles 22 bonded together and to layer 14 by coke layer 18.

EXAMPLE 3

The support is the same as that of example 1. Engobe coating takes place on said support using an emulsion containing small carbon fibres (diameter 7 $\mu$m, length 0.2 mm), the thermosetting resin being a phenolic resin. Following polycondensation and coking of the resin, a membrane is obtained with an air permeability identical to that of the support and with an average pore diameter of 12 $\mu$m.

Such a membrane can either be used directly in filtering operations or can receive, as in example 2, a deposit of 0.1 $\mu$m carbon black particles, which reduce the permeability to 50,000 $cm^3 \cdot s^{-1} \cdot m^{-2} \cdot bar^{-1}$ and the average pore diameter to 5 $\mu$m.

The membranes produced according to these three examples can be used in microfiltering, or supports for receiving a new engobe layer and can undergo selectivity adjustment for use in ultrafiltration.

EXAMPLE 4

The support is an alumina ceramic support with a permeability of 10,000 $cm^3 \cdot s^{-1} \cdot m^{-2} \cdot bar^{-1}$ and average pore diameter 10 $\mu$m.

Engobe coating is carried on this support using an emulsion containing silicon carbide trichites, the thermosetting resin being a phenolic resin. Following polycondensation and coking of the resin, an asymmetric, porous medium is produced, which has a high permeability and which can be used in microfiltration.

What is claimed is:

1. Process for producing a permeable, porous, mineral membrane, comprising depositing on a permeable, porous, mineral support a first layer of a stable emulsion of mineral particles in a solution containing a cokable thermosetting resin which emulsion does not penetrate the support, and carrying out a polycondensation treatment of the first layer of resin, depositing on said support and first polycondensed layer at least one further layer of a stable emulsion of mineral particles in a solution containing a cokable thermosetting resin and carrying out a polycondensation treatment for each further deposited layer, followed by coking of the resin layers on the support, the coked formed ensuring the mechanical connection of the mineral particles both to one another and to the support.

2. Process according to claim 1, wherein the mineral particles are selected from the group consisting of ceramic and carbon materials.

3. A process according to claim 2, wherein the mineral particles of said first layer comprise fibrous material.

4. A process according to claim 3, wherein a plurality of further layers are deposited, and each succeeding layer contains mineral particles of decreasing size.

5. Process according to claim 1 or 2, wherein the particles are in the form of small fibres or grains.

6. Process according to claim 5, wherein the particles are in the form of trichites.

7. Process according to claim 1 or 2, wherein the emulsion is of the engobe type and is obtained by mixing mineral particles in a polyvinyl alcohol to which has been added a deflocculating agent, and that a thermosetting resin is added to this mixture.

8. Process according to claim 7, wherein the deflocculating agent is an ammonium salt.

9. Process according to claim 1 or 2, wherein the emulsion is obtained from a master paste of a paint based on mineral particles in a solution containing a thermosetting resin.

10. Process according to claim 1, wherein the mineral particles of the emulsions have different grain size distributions between the individual layers, decreasing as the distance from the support increases.

11. Process according to claim 10, wherein the mineral particles of the emulsions are made from different materials for the individual layers.

12. Process according to claim 1, wherein the mineral particles of the emulsions are made from different materials for the individual layers.

13. Process according to claim 1 or 2, wherein the mineral support is of carbon.

14. Process according to claim 13, wherein the carbon of the support is selected from the group consisting of polygranular carbons and carbon fibre/carbon matrix composites.

15. Process according to claim 1 or 2, wherein the mineral support is of a ceramic material.

16. Mineral membrane obtained according to the process of claim 1 or 2.

* * * * *